US006703608B2

(12) United States Patent
Holle et al.

(10) Patent No.: US 6,703,608 B2

(45) Date of Patent: Mar. 9, 2004

(54) METHOD AND APPARATUS FOR GENERATING IMPROVED DAUGHTER-ION SPECTRA USING TIME-OF-FLIGHT MASS SPECTROMETERS

(75) Inventors: Armin Holle, Oyten (DE); Jochen Franzen, Bremen (DE)

(73) Assignee: Bruker Daltonik GmbH, Bremen (DE)

(*) Notice: Subject to any disclaimer, the term of this patent is extended or adjusted under 35 U.S.C. 154(b) by 160 days.

(21) Appl. No.: 09/900,478

(22) Filed: Jul. 6, 2001

(65) Prior Publication Data

US 2002/0027194 A1 Mar. 7, 2002

(30) Foreign Application Priority Data

Jul. 13, 2000 (DE) ........................................ 100 34 074

(51) Int. Cl.[7] .......................... B01D 59/44; H01J 49/00

(52) U.S. Cl. ........................................ 250/287; 250/282

(58) Field of Search ................................. 250/287, 282

(56) References Cited

U.S. PATENT DOCUMENTS

| | | |
|---|---|---|
| 5,739,529 A | 4/1998 | Laukien et al. |
| 5,969,348 A | 10/1999 | Franzen |

FOREIGN PATENT DOCUMENTS

| | | |
|---|---|---|
| DE | 25 32 552 A1 | 3/1977 |
| DE | 44 42 348 C2 | 5/1996 |
| DE | 198 56 014 A1 | 7/2000 |
| GB | 2 295 720 A | 6/1996 |
| GB | 2 344 454 A | 6/2000 |

OTHER PUBLICATIONS

Wiley, W.C. et al., "Time–of–Flight Mass Spectrometer with Improved Resolution", The Review of Scientific Instruments, Dec. 1955, 1150–1157, vol. 26, No. 12, U.S.

*Primary Examiner*—Stephen D. Meier
*Assistant Examiner*—Lam Nguyen

(57) ABSTRACT

The invention relates to methods and instruments for measuring daughter-ion spectra (also known as fragment-ion spectra or MS/MS spectra) in time-of-flight mass spectrometers, especially of those with reflectors, with post acceleration of selected parent and daughter ions by raising the potential of a "potential lift" during the passage of the ions. The invention consists of a potential lift device which is equipped with a power supply for velocity spread focusing by delayed acceleration of the ions after lifting the potential, thus making it possible to produce a focus of the velocity spreads of ions at the detector. In addition, it is possible to facilitate the adjustment of the mass spectrometer by dynamically shaping the acceleration pulse of the lift device to focus the velocity spreads of all ion masses in the spectrum on the detector.

22 Claims, 1 Drawing Sheet

METHOD AND APPARATUS FOR GENERATING IMPROVED DAUGHTER-ION SPECTRA USING TIME-OF-FLIGHT MASS SPECTROMETERS

FIELD OF THE INVENTION

The invention relates to methods and instruments for measuring daughter-ion spectra (also known as fragment-ion spectra or MS/MS spectra) in time-of-flight mass spectrometers, especially those with reflectors, with post-acceleration of selected parent and daughter ions by raising the potential of a "potential lift cell" during the passage of the ions.

BACKGROUND OF THE INVENTION

In a time-of-flight mass spectrometer, the mass-to-charge ratio m/z of ions can be determined from their time of flight. Although it is always the mass-to-charge ratio m/z which is measured in mass spectrometry, with m being the mass and z being the number of elemental charges carried by the ion, in the following, for the sake of simplicity, only the mass m and its determination will be referred to. Since many types of ionization, such as MALDI, predominantly supply only single-charged ions (z=1), the difference ceases to exist in practice for these types of ionization.

In a time-of-flight mass spectrometer which is equipped with an ion selector and a velocity-focusing reflector, it is possible to measure the daughter-ion or fragment-ion spectra of parent ions which are selected by the ion selector on the basis of their time of flight. The decay of parent ions into daughter or fragment ions can be induced by introducing excess energy during ionization (so-called PSD "Post Source Decay" spectra) or by applying other methods such as collisionally induced fragmentation (so-called CID "Collisionally Induced Decomposition" spectra).

The two-stage ion reflector according to Mamyrin has achieved considerable popularity as a velocity-focusing reflector. The ions are strongly decelerated during the initial brake stage of the reflector but only weakly decelerated in the second deceleration stage. The faster ions penetrate further than the slower ions into the linear, relatively weak deceleration field of the second deceleration stage of the reflector and therefore travel for a greater distance. With proper adjustment of the two deceleration fields, this difference in distances can be used to compensate for the faster time-of-flight velocity of the ions from a primary focus so that they arrive at the secondary focus at precisely the same time. The focal length of the velocity-focusing device is slightly energy dependent.

The parent ions and the daughter ions resulting from their decay enter the reflector simultaneously with the same average velocity but with different mass-proportional energies, such that they will be dispersed according to their mass within the reflector by their different energies. However, this method of detecting daughter or fragment ions by using these types of reflectors has serious disadvantages. With reasonably good focusing, only ions within a relatively small energy range can be detected—in the commercially available instruments of standard design, this represents approximately 25–30% of the energy range. The reason for this is that the ions always have to pass through the first deceleration field in order to achieve velocity-focused reflection. However, the first deceleration field consumes a good ⅔ of the original acceleration energy. This means that, from parent ions with an initial mass of 3200 atomic mass units, only those fragments between about 2400 and 3200 atomic mass units can be scanned in an initial fragment-ion segment spectrum; only those between 1800 and 2400 mass units can be scanned in a second segment spectrum with reduced reflector voltage, and only those between 1350 and 1800 can be scanned in a third segment spectrum etc. Thus, for an average sized peptide, approximately 10 to 15 segment spectra have to be scanned in order to measure the whole fragment-ion spectrum. Then, a complicated mass-calibration procedure has to be applied to get all the masses from the segment spectra. Only after all these segment spectra have been pasted together, can the daughter ion spectrum be evaluated in the data system as an artificially generated single composite spectrum.

According to the patent application GB 2 344 454 (German patent DE 198 56 014), methods have now been put forward for recording daughter-ion spectra in a single scan using either a linear time-of-flight mass spectrometer, or a time-of-flight mass spectrometer equipped with a two-stage ion reflector. The patent application also describes PSD, CID, MALDI (Matrix Assisted Laser Desorption and Ionization) and velocity focusing by delayed acceleration in the ion source.

One of the proposed methods consists of subjecting the ions to relatively mild acceleration in the ion source (using an acceleration of the ions which is slightly delayed with respect to the ion-producing laser flash), allowing them to decay in an initial drift path, very rapidly lifting their ambient potential to a second acceleration potential during their flight through a small potential cell (a potential lift) and accelerating them in a second acceleration region into a second drift region. The second drift region can be at the same potential as the first drift region and both drift regions are preferably operated at the ground or chassis potential. In the second drift region, very light ions then possess the minimum energy provided by the second acceleration potential and the parent ions which have not decayed have the maximum energy corresponding to the sum of the first and second accelerations.

Such a mass spectrometer already can be used to analyze daughter ions in a linear mode (without using an ion reflector). However, it is more favorable to increase the performance of the instrument by an ion reflector.

If a reflector is able to reflect particles with energy deviations corresponding to about 30% of the maximum energy and the second acceleration potential provides about 70% of the total energy, then the reflector will be able to reflect all the daughter ions in a single voltage adjustment and the entire daughter-ion spectrum can be acquired in a single spectrum acquisition step.

The potential lift itself can be also used to select the parent ions for the daughter ion spectrum. However, it is more favorable to use an additional selector which can produce a better time resolution for the parent ions, i.e. for separating the selected parent ions from other potential ions of similar masses.

However, this very simple arrangement still has disadvantages. In the first place, the mass resolution produced by the velocity focusing function of the delayed acceleration in the ion source can only be adjusted relatively well at for one mass in the spectrum, and adjustment for all other masses is very poor. Secondly, the daughter-ion spectrum as a whole does not show particularly good mass resolution, which means that the signal-to-noise ratio is not very good either.

SUMMARY OF THE INVENTION

The invention consists of a potential lift device which is equipped with a power supply for velocity spread focusing by delayed acceleration of the ions after lifting the potential, thus making it possible to produce a focus of the velocity spreads of ions at the detector. In addition, it is possible to facilitate the adjustment of the mass spectrometer by dynamically shaping the acceleration pulse of the lift device to focus the velocity spreads of all ion masses in the spectrum on the detector. This is particularly useful for daughter-ion spectrum acquisition, providing improved mass resolution, signal-to-noise ratio and detection sensitivity for all masses in the spectrum.

The basic idea of the invention is to generate a spatial distribution of ions of the same mass which is correlated with different velocities inside the potential lift cell, and to use space-velocity correlation focussing for the ions to get better resolved daughter ion spectra. The expression "lift cell" is used here not only for a completely closed cell, it is also used for the space between two adjacent, parallel grids, forming an essentially open cell. The focusing can be performed, for example, by lifting the two grids limiting the lift cell to two slightly different potentials. The focusing can be also performed by delaying the ion post-acceleration, with respect to the lifting event of the potential, in a subsequent post-acceleration region, in a similar manner as in the method of delayed ion acceleration (delayed with respect to the ion-generating laser flash) in the ion source. In both cases it is the aim to velocity-focus the ions by their space-velocity correlation, according to the known principle of Wiley and McLaren. More than one post-acceleration region can be connected to the potential lift so that it will not be necessary to switch the full acceleration voltage, thereby gaining an additional adjustment parameter.

To generate a correlated spatial distribution of ions of the same mass but different velocities within the potential lift cell or the adjacent acceleration region, the locus of the velocity focusing for the ions by delayed acceleration in the ion source no longer has to be positioned to fall into the potential lift cell. The delayed acceleration of ions within an ion source is well-known and need not to be described here. The delay of the acceleration is a delay with respect to the ionization event, e.g. a laser pulse.

It is particularly beneficial to arrange an ion selector between the ion source and potential lift. The velocity focusing for the parent ions from the delayed acceleration of the ion source is then adjusted to take place exactly at the location of the ion selector. A certain distance must be maintained between the ion selector and the potential lift so that the ions disperse again when entering the potential lift because they are travelling at slightly different velocities. It is the so-produced correlation between location and velocity inside the potential lift cell which allows a second velocity focusing by delayed acceleration in the lift region.

This invention can be used already in linear time-of-flight mass spectrometers. The second velocity focusing of the lift cell arrangement is then directly directed onto the ion detector.

In combination with a two-stage reflector, velocity focusing can be achieved at the detector in the same spectrum both for the parent ions and for the fragment ions of all masses produced from them, thus yielding high mass resolution over the entire daughter ion spectrum. Within limits, the focal length for velocity focusing of light ions and of heavy ions can be adjusted at will in a two-stage reflector by selecting the reflector potential and geometry.

It is, however, a complicated process to find the best adjustment of the time-of-flight mass spectrometer to achieve high resolution throughout the whole daughter ion spectrum. The best adjustment requires alteration of the distances between the ion source and the selector, the potential lift, the two-stage reflector and the detector, it requires variation of the voltages at the reflector and potential lift and variation of the delay-time for the post acceleration caused by the potential lift or its acceleration fields. Thus, the adjustment requires a large amount of experimentation. Simulation using appropriate simulation programs is also very time consuming.

For this reason, another idea of the invention is to replace the mechanical distance adjustments which are difficult to carry out, by introducing purely electronically controllable parameters. The idea consists of dynamically varying the voltages at the potential-lift acceleration regions after switching on the acceleration, i.e. applying shaped acceleration pulses, so that ions of all masses in the spectrum experience optimum velocity focusing at the detector.

The basic principle of such pulse-shaped acceleration pulses in combination with delayed acceleration and the resulting effects is already known from U.S. Pat. No. 5,969,348 (DE 196 38 577) where the dynamic delayed acceleration in the ion source is used to achieve high resolution throughout the spectrum.

Normally, delayed acceleration has the effect of giving light ions a shorter travelling distance before they are velocity focused than heavier ions. However, a distribution of focus sites for the velocities of ions of different masses such as this can only be imaged on the detector by subsequent reflection using velocity focusing if the ratios between all the distances in the mass spectrometer are geometrically favorable. Using the standard geometrical design of time-of-flight mass spectrometers, the reflector also has a shorter focal length for velocity focusing in the case of lighter ions. This type of geometry requires an intermediate velocity focus which is nearer to the reflector for light ions than it is for heavier ions, so that ions of all masses in the spectrum velocity-focus at the detector. However, the delayed acceleration in the potential lift provides a distribution of velocity-focal points where the heavier ions focus nearer to the reflector.

By dynamically changing the post-acceleration fields at the potential lift in time after the acceleration has been switched on, it is possible to reverse the distribution of intermediate focus sites so that light ions are velocity focused after a longer path, i.e. nearer to the reflector, than the one for the heavier ions. This configuration can more favorably focused by the reflector onto the detector.

It is even possible to make use of the fact that the lift potential and the post-acceleration voltages cannot be switched instantaneously on a nanosecond scale due to supply lead inductances and stray capacities. The potentials always show a time constant and creep more or less exponentially towards the final value. Targeted adaptation of these time constants and transients is in most cases sufficient to achieve the desired effect. For even better results, the time constant can also be made adjustable.

It is therefore possible to measure parent and fragment ions in the mass range from 60 to 3000 atomic mass units simultaneously with the isotopes resolved throughout the entire mass range. This mass range is of particular interest in the structural elucidation of peptides. Due to the good mass resolution, the now narrower mass signals are significantly higher, therefore displaying an improved ratio of signal height to noise. Because the narrow, high mass signals are more easily distinguished from the background noise, an improved detector sensitivity is also achieved.

DETAILED DESCRIPTION

Figure 1:
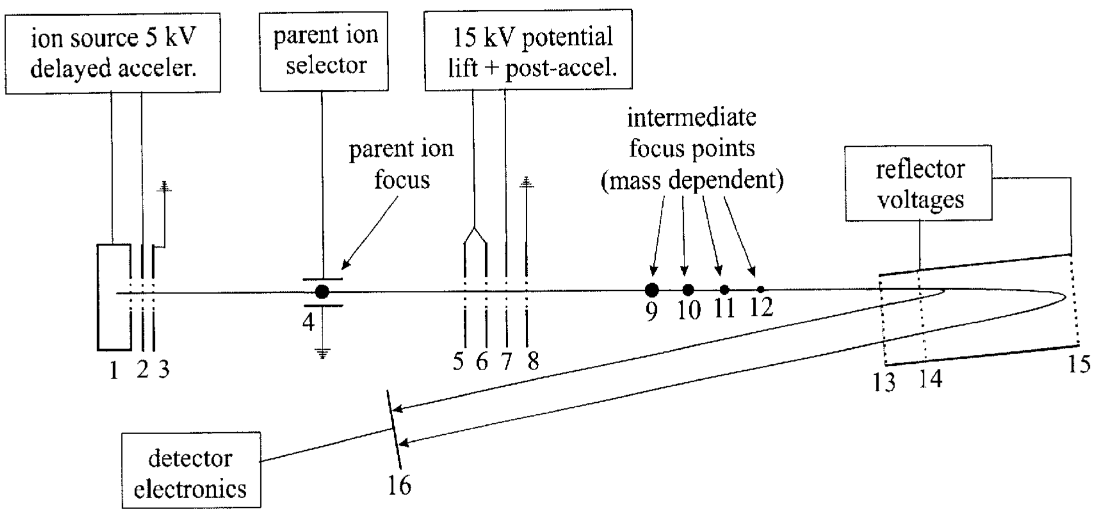
FIG. 1 shows an example for the design of a time-of-flight mass spectrometer according to the invention.

In the embodiment of FIG. 1, ions are generated in an ion source (1) incorporating two acceleration regions which are formed by grids (2) and (3). An ion selector (4) permits selection of the desired ions. The potential lift cell consists of the two grids (5) and (6) which, in this example, are at the same potential. This allows switching to a high voltage during the flight of the desired ions through the cell. Directly hooked to the lift cell, there are two acceleration regions which are formed by the grids (7) and (8) and allow the ions to be velocity focused according to the invention. By dynamic velocity focusing, a sequence of velocity focus sites can be produced for the ions of different masses. These sites are located near to the lift in the case of heavy ions (9), further away for moderately heavy ions (10 and 11) and even further away in the direction of the reflector for the light ions (12). Here, the two-stage reflector is formed from three grids (13), (14) and (15), and is used to focus the ions on the detector (16), using the velocity focus sites (9, 10, 11, 12) as origin for the focusing.

For the generation of daughter ion spectra, the ions are accelerated in the ion source (1, 2 and 3) with only a moderate level of energy, for example, 5 kilovolts. This causes them to fly in the first drift region between the ion source (1, 2 and 3) and the potential lift (5, 6, 7 and 8) relatively slowly. Many ions may decay due to the excess energy they have received during ionization. If, for example, MALDI is used for the ionization, then the decay can be considerably increased by a small increase in the laser power.

The acceleration between the grids (1) and (2) of the ion source, delayed with respect to the laser pulse, is adjusted so that the parent ions which are to be selected are velocity focused precisely at the location of the ion selector (4). This results in well time-resolved ion selection for the selected parent ions and their daughter ions. If the delayed acceleration field is dynamically varied after switching on, the velocity focus for ions of all masses can be adjusted to have the same length. Then the selection of the parent ions in the parent ion selector can be performed by only changing the switching time for the selector, no other parameter has to be changed for optimum selection.

In contrast to the drawing, the ion source does not have to be set up using grids. Excellent ion sources are available where grids are totally absent; even a potential lift cell without grids is possible.

During the next part of their flight, the selected parent ions and their decayed fragment ions, flying with the same speed, enter the cell of the potential lift between the two grids (5) and (6) which, in this example, are short-circuited and are at the same potential as the first drift region. During this time, the next (third) grid (7) is set at an adjustable post-acceleration potential of around 15 kilovolts; the potential of the fourth grid (8) is fixed at ground potential, which is the same as the potential of the second drift region after the potential lift. At the exact moment the ions fly through the cell between the grids (5) and (6) of the potential lift, the grids are switched to the higher post-acceleration potential of 15 kilovolts. Lifting the potential does not influence at all the flight of the ions.

After the potential has been switched to high voltage, the selected ions continue to fly and enter the approximately field-free region between the two grids (6) and (7), where the faster ions of all masses are in front and the slower ions follow behind. There exists a clear correlation between location and velocity of the ions which is used as the basis for space-velocity correlation focusing by switching on an acceleration field in this region. There is a delay for the acceleration voltage switching with respect to the potential lifting incident, therefore we can speak of a second delayed acceleration. Acceleration is started by a change of the potential of either grid (6) or grid (7), most easily by lowering the potential at grid (7). The ions leaving this first acceleration region experience a final acceleration in the region between grids (7) and (8).

Figure 2:
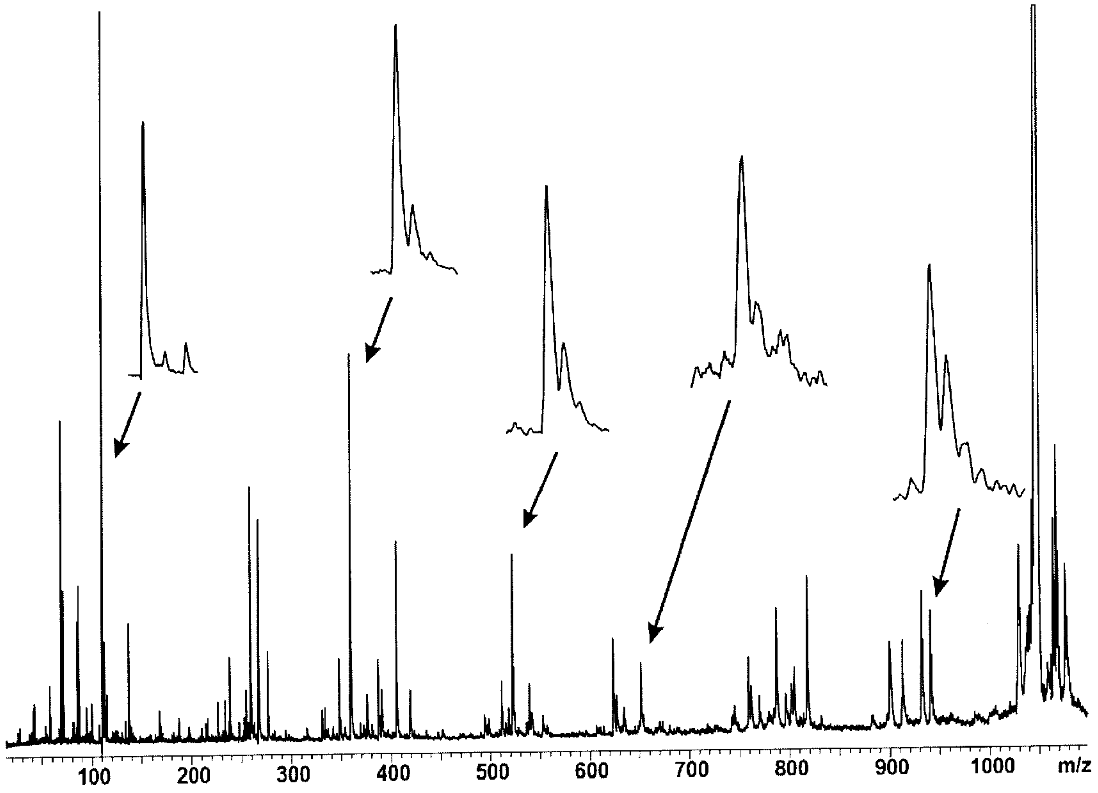
FIG. 2 shows the spectrum of daughter ions from a peptide (Angiotestin II) with all the isotopic mass signals in the spectrum resolved by adjusting the mass spectrometer accordingly.

With the functional elements of the mass spectrometer in the appropriate geometric arrangement, the intermediate focal points obtained by velocity focusing can be velocity focused from the reflector onto the detector for ions of all masses in the spectrum. A daughter-ion spectrum produced by this method is shown in FIG. 2. This spectrum shows the isotopic mass signals resolved over the entire mass range. However, adjusting the mass spectrometer by this means is extremely difficult.

It is therefore favorable to introduce a further possibility for adjustments by additionally shaping the acceleration potentials of the potential lift arrangement in time after switching on the acceleration fields. This procedure is named here "delayed acceleration with pulse shaping" or simply "dynamic delayed acceleration". It is most easily done by varying the potential of grid (7). This adjustment influences the arrangement of intermediate focal points (9, 10, 11, 12) so that the reflector can image them on the detector more easily.

For this purpose, the potential of the grid (7), for example, is reduced at a predetermined rate after the ions from the potential lift have entered the space between the grids (6) and (7), and post-acceleration begins to take effect. This causes the light ions to be accelerated very quickly overall so that they leave the space between the grids (6) and (7) very early and to form a more distant focus point (12).

The heavier ions remain in the acceleration path between the two grids (6) and (7) longer and, due to the further potential drop at the second grid (7), they receive a greater potential difference between fast and slower ions so that they are velocity focused in an intermediate focus point (9) after a shorter distance. The distribution of intermediate focal points (9, 10, 11 and 12) for velocity focusing the ions can therefore be adjusted so that all ions, after being reflected in the velocity-focusing reflector, are velocity focused again precisely at the site of the detector (16). This, of course, only applies to velocity focusing, the lighter ions arrive much earlier overall than the heavier ions. Mass spectra which are well resolved can therefore be recorded.

To achieve the desired effect, the rate of potential drop at the grid (7) can be adjusted by the time constant of the switching, the inductance of the supply lead, the line resistances and the stray capacitances and, in particular, by the capacitance of the grid (7). The most favorable time constant is in the region between some 10 and some 100 Nanoseconds. This effect is supported by the post-acceleration voltage at the grids (5) and (6) approaching the target voltage exponentially. Even the time constant for switching the potential lift helps to move the velocity-focusing points into the desired arrangement.

Unlike the illustration in FIG. 1, acceleration can already begin in the lift cell between grids (5) and (6). The space-velocity correlation focusing can then be generated by switching the two grids of the lift cell to two different voltages. In this case, there is no delay for the acceleration. This case requires a good adjustment of the two time constants for these voltages to prevent any serious acceleration of the ions inside the cell during the main time of the potential lifting period.

After leaving the potential lift and its acceleration regions, the light ions have an energy of just over 15 kiloelectron volts, and parent ions which have not decayed have an energy of 20 kiloelectron volts—both very favorable for the detection in a secondary electron multiplier (SEM).

Light ions and heavy ions together can be guided better to a detector with a smaller surface area through a reflector without grids but with a space focusing component at the entry point, than through the reflector with grids shown in FIG. 1.

The time taken to fly through the potential lift cell is sufficient for switching the potential. Parent ions with a mass of 3000 atomic mass units travel at around 4 mm per microsecond with a kinetic energy of 5 kilovolts and parent ions with a mass of 750 atomic mass units travel at about 8 millimeters per microsecond. If the potential lift cell is approximately 20 millimeters long then switching must occur with a rise time of about a half a microsecond. This is easily possible even if special measures have to be taken which are, however, known to the electronics specialist. The change in potentials according to the invention which occur after the switch-on makes this task easier, since the potentials can approach the target voltage more slowly.

The particular advantages of the method according to the invention are illustrated by the following points:

The greatest advantages are the savings in time and the economic use of the available sample offered by this method because a full spectrum acquisition scan becomes possible for the complete daughter ion spectrum, instead of 10 to 15 segment spectra required hitherto. With MALDI, normally the acquisition of a single spectrum does not show a good quality because of too few ions in the spectrum. Therefore, the total spectrum acquisition consists of 20 to 100 single spectrum scans, acquired subsequently from the same sample spot with as many laser bombardments and added together to give a "sum spectrum".

A further advantage consists in the fact that the calibration curve for the masses only needs to be recorded for a single spectrum and not for numerous segment spectra as was the case previously. The pasting of segment spectra is no longer necessary.

A considerable advantage consists in the higher sensitivity for light ions. The light fragment ions receive a larger energy and are therefore much more easily and more sensitively detected by the ion detector. The secondary ion multiplier, which has been the usual detection device until now, can only detect ions with relatively high kinetic energies.

A further advantage is the better quantitative analysis because the relative intensities of the ions throughout the spectrum are more truly reported than in the case of segmented spectra.

Under certain circumstances, the arrangement can be installed in existing mass spectrometers, even if these mass spectrometers have a high-vacuum valve between the ion source and the flight tube and are therefore based on "potential free" flight paths (flight paths at chassis or ground potential). However, retrofit installations demand a compromise in the quality of the daughter-ion spectra as the necessary focal lengths are not fully available.

The ion source for this operation can be run at a very low potential. It has been observed that the PSD spectra from low potential MALDI ion sources look cleaner and show more significant peaks for peptide identification.

The potential lift device can also be designed to fold out. The potential lift, which normally carries at least three grids, can then be removed completely from the ion beam for the highly sensitive measurement of spectra of the original, non-decayed ions formed in the ion source.

However, the invention is not only directed to metastable ions generated in the ion source, i.e. ions which have gained excess energy during the ionization process. A collision cell with a collision gas supply to generate collision-induced fragment ions can be installed, for example, in the first field-free flight path between the diaphragm (3) and the ion selector (4). An arrangement such as this does not rely on the production of metastable ions in the ion source. Also for a collision cell the invention of the potential lift is beneficial since the collision cell can be operated at ground potential.

If the collision cell is located near to the ion source, then the metastable ions which are produced in it can also be detected. A collision cell which is located near to the potential lift, on the other hand, only favors the detection of ions which have decayed spontaneously within the collision cell.

A mass spectrometer according to the invention is particularly appropriate for the identification of proteins or the recognition of mutated proteins or proteins which have been altered in some other way. For this procedure, the proteins are first digested by enzymes such as trypsin. The peptide mixture resulting from protein digestion, analyzed by MALDI ionization, yields a so-called "fingerprint spectrum" which can be used immediately for identification in protein-sequence databases. If this does not produce clear identification, or if some of the peptides do not match the masses from the database, then daughter-ion spectra can be produced from these peptides immediately. With this invention, acquiring a daughter-ion spectrum does not take any longer than acquiring a fingerprint spectrum. The daughter-ion spectrum makes identification of the sample clear or shows differences between the sequences in the sample and those in the database which are caused by mutations or post-translational modifications. All these investigations can be carried out without having to remove the sample from the mass spectrometer. Modem mass spectrometers use sample carriers with 384 or even 1536 samples.

Of course, time-of-flight mass spectrometers of completely different design, such as time-of-flight spectrometers with more than one reflector, can also be equipped with a second accelerating device by a potential lift with space-velocity correlation focusing according to this invention. Any mass-spectrometer specialist with knowledge of this invention should be in the position to design installations and modifications possible for these types of mass spectrometers.

What is claimed is:

1. Method for acquiring spectra of daughter ions produced by decay from parent ions in a time-of-flight mass spectrometer comprising the following steps:

a) generating or introducing in an ion source an assembly of ions having an initial kinetic energy spread, b) accelerating the ions into a first field-free drift path of the mass spectrometer, c) letting a fraction of the ions decay into daughter ions during their flight in this drift path, d) passing the parent ions to be analyzed, together with their daughter ions having equal velocity, into a potential lift cell, e) raising the potential of the lift cell to high voltages during the passage of the ions, f) letting the ions pass into an adjacent region, where the ions exhibit a spatial distribution correlated with their velocities essentially caused originally by the different initial kinetic energies in the ion source, g) switching on, after a predetermined delay with respect to the potential raise in the lift cell, a first post-acceleration field in this first adjacent region, thereby starting the acceleration of the ions and generating a space-velocity correlation focusing effect for the ions that is adjusted by setting the delay time and the acceleration field strength to the location of an ion detector, h) post-accelerating, if necessary, the ions in one or more subsequent post-acceleration regions and thereby accelerating the ions into a second field-free drift path, i) measuring the flight times of the ions which they need to arrive at the ion detector, and j) analyzing the ions with respect to their masses by their flight times.

2. Method according to claim 1, wherein the potential lift cell is used to select the parent ions and their daughter ions for the daughter ion spectrum.

3. Method according to claim 1, wherein a parent ion selector between ion source and potential lift cell selects the parent ions and their daughter ions having equal velocity.

4. Method according to claim 3, wherein a delay between the generation of ions in the ion source in step a) and their acceleration in step b) creates a space-velocity correlation focusing effect in the ion source, and wherein the velocity focus for the parent ions to be selected is adjusted to the location of the parent ion selector.

5. Method according to claim 1, wherein the ions in the ion source are generated by a laser pulse.

6. Method according to claim 5, wherein the ions are generated by matrix-assisted laser desorption (MALDI).

7. Method according to claim 1, wherein excess energy in the ion generation process produces metastable ions and causes a fraction of the ions, in step c), to decay in the first field-free drift path.

8. Method according to claim 1, wherein the ions pass, in the first field-free drift path, a region filled with collision gas, and wherein the collisions of the ions with the collision gas molecules cause the decay of the ions in step c).

9. Method according to claim 1, wherein the potential lift cell itself acts as first post-acceleration region, by switching on an acceleration field in the potential cell itself after raising the lift cell potential, thus combining steps e), f), and g).

10. Method according to claim 1, wherein an energy-focusing ion reflector is located between potential lift cell arrangement and detector, and wherein the combined effect of the space-velocity correlation focusing of the potential lift cell arrangement in step g) and the energy-focusing effect of the reflector velocity-focuses the ions onto the detector.

11. Method according to claim 1, wherein the space-velocity correlation focusing of the potential lift cell arrangement in step g) produces intermediate velocity focus points between potential lift cell arrangement and ion reflector.

12. Method according to claim 1, wherein the potential lift cell arrangement with its post-acceleration regions can be moved out of the flight path of the ions.

13. Method for acquiring spectra of daughter ions produced by decay from parent ions in a time-of-flight mass spectrometer comprising the following steps:

a) generating or introducing in an ion source an assembly of ions having an initial kinetic energy spread, b) accelerating the ions into a first field-free drift path of the mass spectrometer, c) letting a fraction of the ions decay into daughter ions during their flight in this drift path, d) passing the parent ions to be analyzed, together with their daughter ions having equal velocity, into a potential lift cell, e) raising the potential of the lift cell to high voltages during the passage of the ions, f) letting the ions pass into an adjacent region, where the ions exhibit a spatial distribution correlated with their velocities essentially Caused originally by the different initial kinetic energies in the ion source, g) Switching on, after a predetermined delay with respect to the potential raise in the lift cell, a first post-acceleration field in this first adjacent region, thereby starting the acceleration of the ions and generating a space-velocity correlation focusing effect for the ions, wherein a dynamic variation of the acceleration field strength in the first post-acceleration region of the potential lift cell arrangement influences the space-velocity correlation focusing in such a way that ions of all masses in the daughter ion spectrum experience optimum velocity focusing at the location of an ion detector, thus producing a daughter ion spectrum with high resolution throughout the whole spectrum, h) post-accelerating, if necessary the ions In one or more subsequent post-acceleration regions and thereby accelerating the ions into a second field-free drift path, i) measuring the flight times of the ions which they need to arrive at the ion detector, and j) analyzing the ions with respect to their masses by their flight times.

14. Method according to claim 13, wherein the dynamic variation of the acceleration field strength consists simply in a switching time constant for the field-producing voltages.

15. Method according to claim 14, wherein the time constant is adjustable.

16. Method according to claim 14, wherein the time constant is in the range of a few ten to a few hundred nanoseconds.

17. Time-of-flight mass spectrometer comprising a) an ion source for generating and accelerating ions including a voltage supply for the ion source and for an acceleration voltage delayed with respect to the ion generating process, b) a potential lift cell including a switchable voltage supply, c) at least one post-acceleration region adjacent to the potential lift cell including at least one voltage supply, a voltage supply for a first post-acceleration region adjacent to the lift cell being capable of delivering a voltage for a first acceleration field to be switched on with a predetermined delay after the potential raise of the lift cell, the voltage supply for the first post-acceleration region delivering a voltage such that the first acceleration field has a field strength that varies dynamically after the voltage supply is switched on, and d) a detector including voltage supply and signal amplifier for measuring the flight times of the ion.

18. Time-of-night mass spectrometer according to claim 17, wherein an ion selector, powered by a switchable voltage supply, is installed between ion source and potential lift cell.

19. Time-of-flight mass spectrometer according to claim 17, wherein an ion reflector is located between the post-acceleration regions of the potential lift cell arrangement and the ion detector.

20. Time-of-flight mass spectrometer according to claim 17 wherein the dynamic variation consists is produced by a switching time constant.

21. Time-of-flight mass spectrometer according to claim 20, wherein the time constant amounts to a few ten to a few hundred nanoseconds.

22. Time-of-flight mass spectrometer according to claim 18, wherein the potential lift cell arrangement with its post-acceleration regions can be moved out of the flight path of the ions.

* * * * *